United States Patent Office.

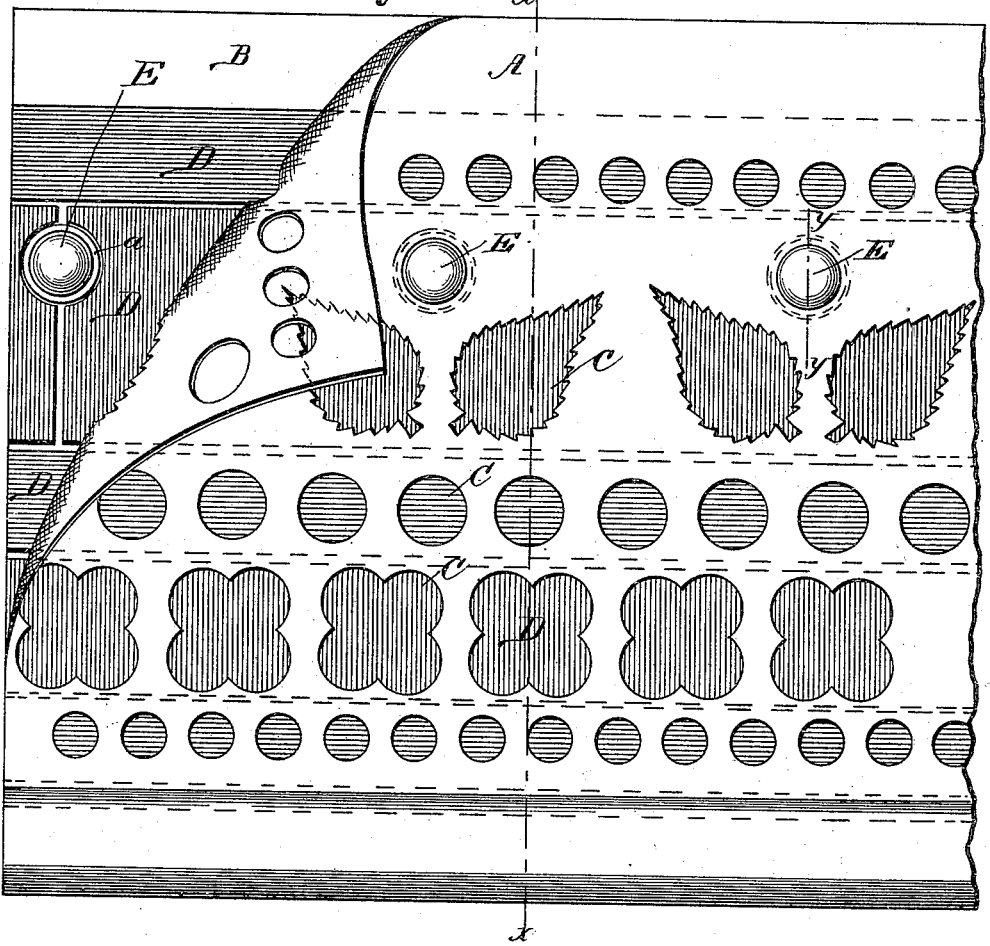

GEORGE BASSETT, OF CHICAGO, ILLINOIS.

ORNAMENTAL TRANSPARENCY.

SPECIFICATION forming part of Letters Patent No. 363,356, dated May 24, 1887.

Application filed May 22, 1886. Serial No. 202,959. (No model.)

*To all whom it may concern:*

Be it known that I, GEORGE BASSETT, a subject of the Queen of Great Britain, residing in Chicago, in the county of Cook and State of Illinois, have invented certain new and useful Improvements in Ornamental Transparencies, of which the following is a specification.

This invention relates more particularly to ornamental transparencies or glass panels in which pieces of plain, ground, or colored glass are secured between ornamentally cut-out face layers of rigid material, as set forth in United States Letters Patent No. 197,240, granted me November 20, 1877.

The patented construction referred to contemplates and is confined to face layers of ornamentally cut-out wood or card-board, or any other suitable substance possessing rigidity to a degree rendering it liable to be warped and cracked or else shrunk or expanded by reason of variations in the temperature to which transparencies of this character are necessarily subjected, and, indeed, in practice I have found this in many instances a serious objection to the employment of face layers of both wood and card-board. The shrinking or expanding of the face layers tends to open the joints between the ornamental pieces of glass and said layers, and sometimes to fracture the strips and pieces of glass employed, while the warping and cracking of the face layers not only produce these defects in the transparency, but disfigure it to such an extent that it is unfitted for use and cannot be restored.

The object of this invention is not only to avoid the above objections, but to have the face layers of such a material that the layers, and therefore the transparency, may have an irregular form—that is to say, may be curved or angular or bent form—while at the same time neither the ornamental glass pieces nor their joints with the layers shall be subject to any undue strain, but the screen as a whole be flexible to such an extent that its original form shall not be materially affected by variations in temperature, however great they may be; and to this end I employ face layers composed of a flexible material, as hereinafter described, and shown in the accompanying drawings, in which—

Figure 1 represents a front elevation of an ornamental transparency with one of the face layers folded over from and exposing the ornamental pieces of glass confined between the opposing face layers; Fig. 2, a cross-section of the same on line *x x* of Fig. 1; Fig. 3, a similar view on the line *y y* of Fig. 1.

Similar letters of reference indicate the same parts in the several figures of the drawings.

In the drawings, A B respectively represent opposing face layers, in which are a series of ornamental openings registering with each other and formed by cutting or stamping out pieces therefrom, so that the screen may have a number and variety of designs, and give to it as a whole any desired effect. These face layers may be composed of paper, linen, silk, velvet, or any textile material which will give a pleasing and attractive appearance to the screen; but when using textile fabrics I prefer to use next the transparent materials or glass hereinafter described paper afterward covered with the textile fabrics, for by so doing the transparency will have the desired flexibility, and at the same time be relieved from the stretching and drawing common to textile fabrics, which may, moreover, thereby be held in a much smoother condition than when attached directly to the glass.

The glass or other transparent or translucent materials may be in the form of sheets or strips, as shown at D, and while these strips are shown with regular edges, they may be of irregular forms of sheet-glass fitted together to an extent that shall insure them against displacement after having once been secured between the facings. It is also proposed to employ glass or transparent or translucent materials in other forms, either alone or in connection with the flat strips of glass, as shown at E, and these forms may be in the shape of bull's-eyes or imitations of cut gems confined in suitable openings between the facings, and, if necessary, provided with a flange, as shown at *a* in Figs. 1 and 3, to better insure their being held by the facings.

In some instances the flat strips of glass may be cut out to receive the bull's-eyes or gems, as shown in Fig. 1; but when the design permits, this cutting out is not necessary.

In constructing these transparencies the designs are first cut or stamped out of the face layers, and after applying the cement, and preferably a transparent adhesive material, to one of the facings as it lies spread out on a table, the strips and pieces of ornamental glass and the gems are placed in their proper position thereon next the adhesive material; and after so placing the glass and gems in their operative position the opposing face layer is likewise coated with the adhesive material and laid over the gems, so that the cut-out portions of the face layer will register with those of the opposing layer and expose the gems and glass, as indicated in the drawings.

If the exposed surfaces of the face layers are of a fabric or material liable to be drawn by contact with the adhesive material, or afterward stretched or shrunk materially by handling, the glass and gems are secured directly to layers composed of paper, and the outer facings then mounted thereon in any suitable way; and the paper so employed may be in sheets, with ornamental designs stamped out to correspond and register with those of the exposed facings, or may be of strips so arranged and secured to the glass pieces and gems as not to be exposed in the openings of the outer facings.

Ornamental transparencies constructed as herein described afford not only pleasing but cheap ornamentations, which may be used for bottom borders for window-shades, decorating walls, as panels for doors and windows, and are desirable for screens, and particularly those which are used in front of grates, and therefore subject to sudden and great variations in temperature, for by the employment of facings composed of flexible material the liability of the screen to become warped and cracked by these variations in temperature is entirely avoided, as I have satisfactorily demonstrated; and, furthermore, these ornamental transparencies are much more conveniently made when flexible facings are employed than where such facings are composed of veneers of wood or pasteboard, as heretofore.

Having described my invention, what I claim, and desire to secure by Letters Patent, is—

The ornamental transparency herein described, consisting of opposing face layers composed of flexible material for designs or ornamental figures cut or stamped therein, an intermediate layer composed of strips of glass and imitation jewels, exposed through the cut-out portions of the face layers and retained in position by adhesive material, as and for the purpose set forth.

GEORGE BASSETT.

Witnesses:
   W. W. ELLIOTT,
   KEO WEST.